US006175806B1

United States Patent
Thuente (10) Patent No.: US 6,175,806 B1
(45) Date of Patent: Jan. 16, 2001

(54) METHOD AND APPARATUS FOR DETECTING CYCLE SLIPS IN NAVIGATION SIGNALS RECEIVED AT A RECEIVER FROM A SATELLITE-BASED NAVIGATION SYSTEM

(75) Inventor: Perry John Thuente, Hanover Park, IL (US)

(73) Assignee: Caterpillar Inc., Peoria, IL (US)

(*) Notice: Under 35 U.S.C. 154(b), the term of this patent shall be extended for 0 days.

(21) Appl. No.: 08/092,684

(22) Filed: Jul. 16, 1993

(51) Int. Cl.$^7$ .......................................... G01S 5/02

(52) U.S. Cl. ..................... 701/213; 701/214; 701/220

(58) Field of Search .................................. 364/449, 444, 364/453, 457; 342/355–359, 451, 461; 340/988, 993; 370/75; 701/213, 214, 216, 220

(56) References Cited

U.S. PATENT DOCUMENTS

| | | | |
|---|---|---|---|
| 3,702,477 | * 11/1972 | Brown | 342/451 |
| 4,578,678 | * 3/1986 | Hurd | 342/357 |
| 4,646,096 | 2/1987 | Brown | 342/357 |
| 4,672,382 | * 6/1987 | Fukuhara et al. | 342/357 |
| 4,731,613 | * 3/1988 | Endo et al. | 342/357 |
| 4,758,959 | * 7/1988 | Thoone et al. | 364/454 |
| 4,821,294 | * 4/1989 | Thomas, Jr. | 364/459 |
| 4,879,713 | * 11/1989 | Ichiyoshi | 370/75 |
| 4,903,212 | * 2/1990 | Yokouchi et al. | 364/449 |
| 4,928,107 | * 5/1990 | Kuroda et al. | 364/449 |
| 5,101,416 | * 3/1992 | Fenton et al. | 375/206 |

FOREIGN PATENT DOCUMENTS 0565191   10/1993   (EP).

OTHER PUBLICATIONS

Kumar, "A Novel Multi–Stage Estimation of Signal Parameters" IEEE 1990, pp. 2491–2494.*
Lapucha et al., "The Use of INS/GPS in a Highway Survey System", IEEE 1990, pp. 413–420.*
Wei et al, "Testing a Decentralized Filter for GPS/INS Integration", IEEE 1990, pp. 429–435.*
Sennott, J.W. and D. Pietrazewski, "Experimental Measurement and Characterization of Ionospheric and Multipath Errors in Differential GPS", Proceedings of the ION National Technical Meeting, pp. 168–172, Jan., 1987.
Sennott, Jim, "Multipath Sensitivity and Carrier Slip Tolerance of an Integrated Doppler DGPS Navigation Algorithm", *IEEE Plans–90*, Las Vegas, NV, Mar., 1990.
IEEE Plans'92: Position Location and Navigation Symposium Reocrd—pp. 403–11: M. Wei et al: Maintaining High Accuracy GPS Pos. on the Fly.

(List continued on next page.)

*Primary Examiner*—Tan Nguyen
(74) *Attorney, Agent, or Firm*—Sterne, Kessler, Goldstein & Fox (57) ABSTRACT

Carrier signal cycle slip errors occurring at a receiver in a satellite-based navigation system, such as NAVSTAR GPS, are detected. A continuous navigation signal is received from a satellite. Cycles of the carrier wave of the navigation signal are counted over a time $\Delta t$. The cycle count and the time $\Delta t$ are used to compute a first velocity of the receiver along a vector between the receiver and the satellite. A second velocity of the receiver is received from an inertial reference unit associated with the receiver. A component of the second velocity along the vector to the satellite is computed. A difference between the first and second velocities is then computed and compared to predetermined value. If the difference exceeds the predetermined value, then a cycle slip error is indicated.

4 Claims, 8 Drawing Sheets

OTHER PUBLICATIONS

Greenspan et al., "Accuracy Of Relative Positioning By Interferometry With Reconstructed Carrier GPS: Experimental Results," Presented at Third International Symposium on Satellite Doppler Positioning, Las Cruces, NM., Feb., 1982. CSDL–P–1486, pp. 1–19.

Nielson et al., "GPS Aided Inertial Navigation," *IEEE AES Magazine*, Mar., 1986, pp. 20–26.

Upadhyay et al., "Benefits Of Integrating GPS And Inertial Navigation Systems," CSDL–P–1503, Jun., 1982, pp. 1–13.

Bose, "GPS/PLRS Aided Inertial Land Navigation System Performance," IEEE Plans '86 Position Location And Navigation Symposium, Record 86 CH 2365–5, Ceasars Palace, Las Vegas, NV., Nov. 4–7, 1986.

Schuchman et al., Applicability Of An Augmented GPS For Navigation In The National Airspace System, 8078 Proceedings Of The IEEE, 77 (1989) Nov., No. 11, New York, U.S.

Van Graas et al., "Real–Time Attitude And Heading Determination Using GPS," *GPS World*, Attitude Determination, Mar., 1992, pp. 32–39.

\* cited by examiner

Fig_2_

Fig_5

Fig-6-

METHOD AND APPARATUS FOR DETECTING CYCLE SLIPS IN NAVIGATION SIGNALS RECEIVED AT A RECEIVER FROM A SATELLITE-BASED NAVIGATION SYSTEM

FIELD OF THE INVENTION

This invention relates generally to the field of navigation systems which use a constellation of Earth-orbiting satellites to determine the position of a receiver at or near the Earth's surface. More specifically, the invention relates to a method and apparatus for detecting and quickly compensating for large cycle slips to improve the accuracy of position estimates.

BACKGROUND OF THE INVENTION

Several national governments, including the United States (U.S.) of America, are presently developing a terrestrial position determination system, referred to generically as a global positioning system (GPS). A GPS is a satellite-based radio-navigation system which is intended to provide highly accurate three-dimensional position information to receivers at or near the surface of the Earth.

The U.S. government has designated its GPS the "NAVSTAR." The NAVSTAR GPS is expected to be declared fully operational by the U.S. government in 1993. The government of the former Union of Soviet Socialist Republics (U.S.S.R.) is engaged in the development of a GPS known as "GLONASS". Further, two European systems known as "NAVSAT" and "GRANAS" are also under development. For ease of discussion, the following disclosure focuses specifically on the NAVSTAR GPS. The invention, however, has equal applicability to other global positioning systems.

In the NAVSTAR GPS, it is envisioned that four orbiting GPS satellites will exist in each of six separate circular orbits to yield a total of twenty-four GPS satellites. Of these, twenty-one will be operational and three will serve as spares.

Each GPS satellite will orbit the Earth approximately once every 12 hours. This coupled with the fact that the Earth rotates on its axis once every twenty-four hours causes each satellite to complete exactly two orbits while the Earth completes one revolution.

The position of each satellite at any given time will be precisely known and will be continuously transmitted to the Earth. This position information, which indicates the position of the satellite in space with respect to time (GPS time), is known as ephemeris data.

In addition to the ephemeris data, the navigation signal transmitted by each satellite includes a precise time at which the signal was transmitted. The distance or range from a receiver to each satellite may be determined using this time of transmission which is included in each navigation signal. By noting the time at which the signal was received at the receiver, a propagation time delay can be calculated. This time delay when multiplied by the speed of propagation of the signal will yield a "pseudorange" from the transmitting satellite to the receiver. A pseudorange computed in this manner is called a "code" pseudorange.

The range is called a "pseudorange" because the receiver clock may not be precisely synchronized to GPS time and because propagation through the atmosphere introduces delays into the navigation signal propagation times.

These result, respectively, in a clock bias (error) and an atmospheric bias (error). Clock biases may be as large as several milliseconds.

Using these two pieces of information (the ephemeris data and the pseudorange) from at least three satellites, the position of a receiver with respect to the center of the Earth can be determined using passive triangulation techniques.

Triangulation involves three steps. First, the position of at least three satellites in "view" of the receiver must be determined. Second, the distance from the receiver to each satellite must be determined. Finally, the information from the first two steps is used to geometrically determine the position of the receiver with respect to the center of the Earth.

Triangulation, using at least three of the orbiting GPS satellites, allows the absolute terrestrial position (longitude, latitude, and altitude with respect to the Earth's center) of any Earth receiver to be computed via simple geometric theory. The accuracy of the position estimate depends in part on the number of orbiting GPS satellites that are sampled. Using more GPS satellites in the computation can increase the accuracy of the terrestrial position estimate.

Conventionally, four GPS satellites are sampled to determine each terrestrial position estimate. Three of the satellites are used for triangulation, and a fourth is added to correct for the clock bias described above.

For a more detailed discussion on the NAVSTAR GPS, see Parkison, Bradford W. and Gilbert, Stephen W., "NAVSTAR: Global Positioning System—Ten Years Later," *Proceedings of the IEEE*, Vol. 71, No. 10, October 1983; and *GPS: A Guide to the Next Utility*, published by Trimble Navigation Ltd., Sunnyvale, Calif., 1989, pp. 1–47, both of which are incorporated herein by reference. For a detailed discussion of a vehicle positioning/navigation system which uses the NAVSTAR GPS, see commonly owned U.S. Pat. Appl. Ser. No. 07/628,560, entitled "Vehicle Position Determination System and Method," filed Dec. 3, 1990, which is incorporated herein by reference.

NAVSTAR GPS envisions two modes of modulation for the carrier wave using pseudorandom signals. In the first mode, the carrier is modulated by a "C/A signal" and is referred to as the "Coarse/Acquisition mode". The Coarse/Acquisition or C/A mode is also known as the "Standard Positioning Service". The second mode of modulation in the NAVSTAR GPS is commonly referred to as the "precise" or "protected" (P) mode.

The P-mode sequences are held in secrecy by the United States government and are not made publicly available. The P-mode is intended for use only by Earth receivers specifically authorized by the United States government. Thus, the P-mode modulated data is generally not available so that many GPS users must rely solely on the GPS data provided via the C/A mode of modulation. This relegates most users to a legs accurate positioning system.

The clock and atmospheric errors discussed above add to the inaccuracy of the positioning system. Other errors which affect GPS position computations include selective availability (accuracy corruption intentionally introduced by the U.S. government for reasons of national security), receiver noise, signal reflections, shading, and satellite path shifting (e.g., satellite wobble). These errors result in computation of incorrect pseudoranges and incorrect satellite positions. Incorrect pseudoranges and incorrect satellite positions, in turn, lead to a reduction in the precision of the position estimates computed by a vehicle positioning system.

Methods are available for compensating or correcting for many of these errors. For example, one method uses a differential system (discussed below) to produce a linear bias for each pseudorange (i.e., a bias is calculated for each satellite). A base station, having a fixed, known position, computes a pseudorange to each satellite. The base station further computes a distance between its known position and the position of each satellite (computed from the ephemeris data). By comparing the pseudorange to each computed distance, a pseudorange bias can be computed for each satellite. The pseudorange bias for each satellite can then be transmitted to the vehicle for use in the position estimate computations.

A differential GPS system produces precise position estimates. However, a base station is not always available to a receiver wanting to compute an accurate position estimate.

Accumulated delta range (ADR) or integrated doppler techniques may also be used to improve the accuracy of position estimates. ADR techniques sense changes in the phase of the carrier wave of a GPS navigation signal received at a receiver. The changes in phase can be related to a change in the line-of-sight distance (delta ranges) between the transmitting satellite and the receiver.

An ADR is computed by tracking the phase of the carrier wave of the GPS navigation signal. For example, as a satellite and a GPS receiver move away from each other, the increase in distance (i.e., the delta range) can be noted as a phase change in the GPS carrier wave. Because the GPS carrier wave is a continuous sinusoid, a delta range (DR) is not an absolute range. Rather, a delta range is a change in the range between the satellite and the receiver.

If an initial offset (cycle count) is known, the delta range can be used to compute an accumulated delta range. The accumulated delta range is an actual range estimation. Therefore, the accumulated delta range may be used in place of the code pseudorange. Alternatively, either the delta range or the accumulated delta range may be used in conjunction with the code pseudorange to compute a refined pseudorange. The accumulated delta range may also be called a "carrier" pseudorange.

GPS carrier phase techniques are described in detail in Dr. Jim Sennott (Dept. of Electrical & Computer Engineering, Bradley University, Peoria, Ill.) and Jay Spalding (U.S. Coast Guard, R&D Center Groton, Conn.), "Multipath Sensitivity and Carrier Slip Tolerance of an Integrated Doppler DGPS Navigation Algorithm," U.S. Department of Transportation, Transportation Systems Center, Cambridge, Mass., U.S. DOT University Contract DTRS-57-85-C-0090, and in Patrick Y. C. Hwang and R. Grover Brown, "GPS Navigation: Combining Pseudorange with Continuous Carrier Phase Using a Kalman Filter," Proceedings ION GPS-88, September 1989, pp. 185–190; each of which is incorporated herein by reference.

A problem with known ADR techniques is that cycle slips may occur. A cycle slip occurs when a receiver loses track of the phase of a carrier wave. This might occur, for example, due to shading of the receiver from direct line-of-sight reception from the satellite or from noise, either of which cause a momentary loss of receiver lock on the GPS carrier signal. When a cycle slip occurs, the accumulated delta range is lost (because the initial offset is no longer precisely known) and must be re-accumulated.

Many conventional navigation systems may not detect a cycle slips. If a cycle slip is not detected, then the incorrect cycle count will introduce error into the position computations. The conventional navigation system, i.e., the Kalman filter of the navigation system, will correct for the error, however, it may take tens of seconds before compensation for the error begins and several minutes before the error is substantially eliminated from the position estimates. These times are too long for real time positioning in many applications.

What is needed is a method for quickly detecting cycle slips.

SUMMARY OF THE INVENTION

The invention is a system and method for use with a satellite based navigation system. The accuracy of vehicle position estimates is improved using accumulated delta range (ADR), i.e., carrier or integrated doppler, techniques to improve the precision of code pseudoranges. Both carrier data and code pseudoranges are used to compute a refined pseudorange. The carrier data is monitored to detect large cycle slips. If a large cycle slip is detected, the carrier data for that particular satellite is not used in computing the refined pseudorange.

The invention detects large cycle slips in real-time and substantially compensates for the errors caused by cycle slips. Velocity data from an inertial reference unit (IRU) associated with the vehicle is used to monitor for cycle slips. The apparatus of the invention includes a GPS receiver for receiving the GPS navigation signals from the satellites and outputting ADR data and raw GPS data. Each pseudorange is refined by a pseudorange filter, e.g., a Kalman filter, using the carrier data. The refined pseudoranges are then used by a GPS Kalman filter to produce a precise vehicle position estimate.

The method of the invention proceeds as follows. A navigation signal is received from a satellite at the receiver. Cycles of the carrier wave of the navigation signal are counted over a time $\Delta t$. The cycle count is then used to compute a first velocity of the receiver along a vector between the receiver and the satellite over time $\Delta t$.

A second velocity of the receiver is received from an inertial reference unit associated with the receiver. A component of the second velocity along the vector between the satellite and the receiver is computed. A difference between the first velocity and the component of the second velocity along the vector between the satellite and the receiver is then compared to a predetermined value or threshold. If the difference exceeds the predetermined value, then a cycle slip error is indicated.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

The present invention is now described with reference to the figures where like reference numbers denote like elements/steps.

Figure 1:
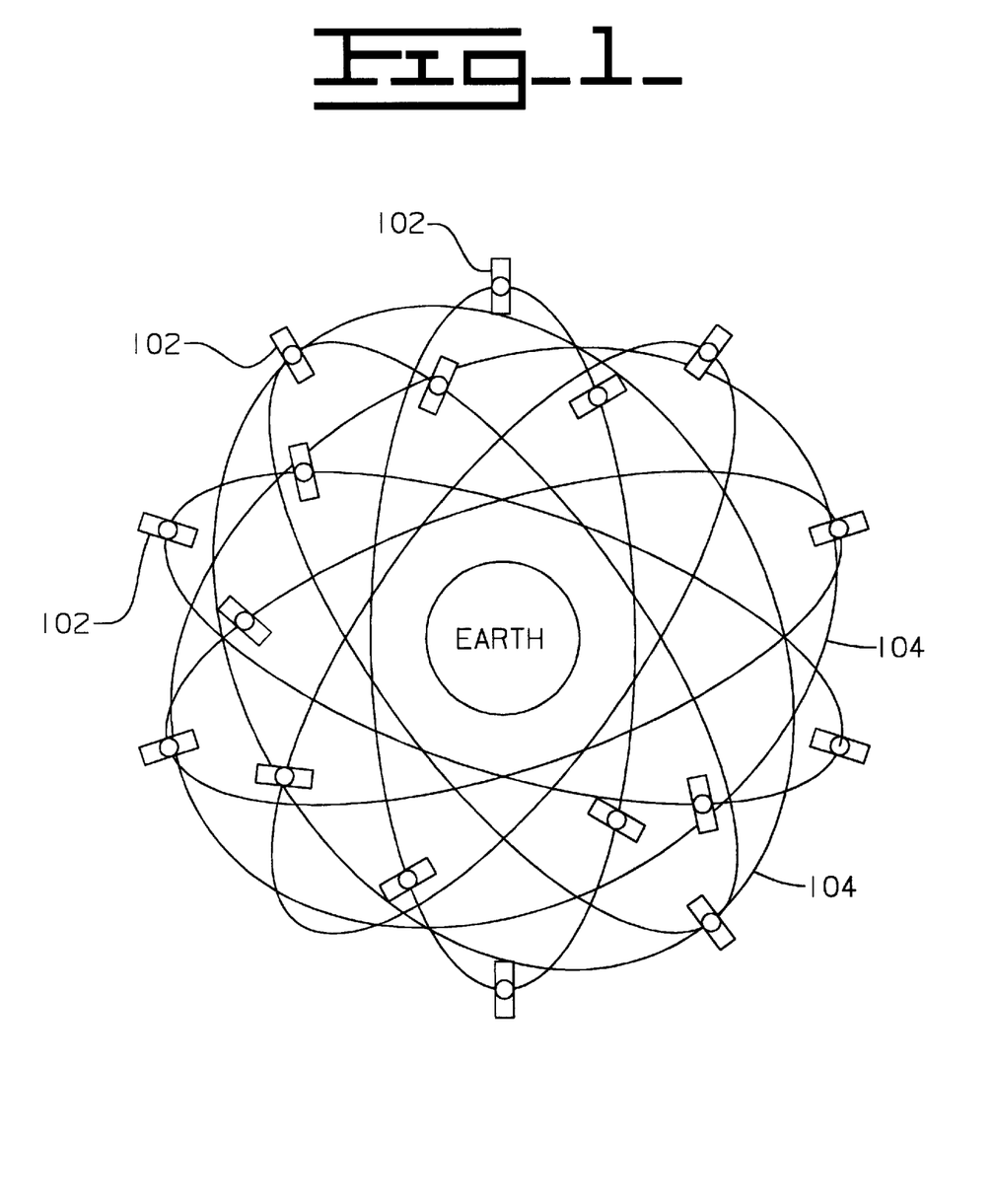
FIG. 1 is a diagram depicting the NAVSTAR GPS satellites in their respective orbits around the Earth.

The invention is a method and apparatus for detecting large cycle slips in a satellite based navigation system so that the system can quickly recover therefrom. In the preferred embodiment, the NAVSTAR Global Positioning System (GPS) is used. As discussed above and illustrated in FIG. 1, the NAVSTAR GPS includes twenty-one operational satellites 102 which orbit the Earth in six orbits 104.

Figure 2:
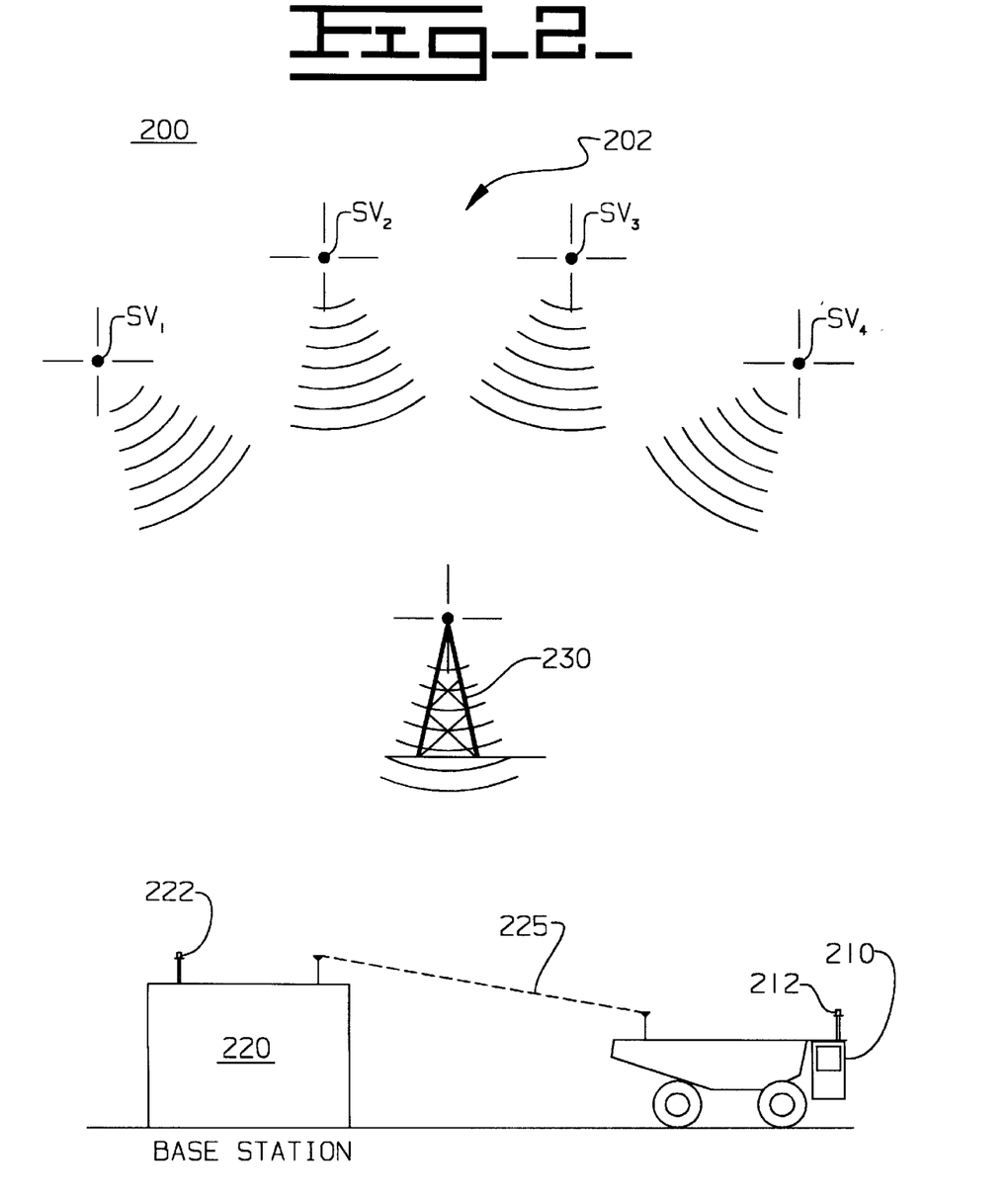
FIG. 2 is a diagram illustrating an autonomous vehicle system which includes a constellation of four GPS satellites, a pseudolite, a base station, and an autonomous vehicle.

The invention is described in the environment of an autonomous vehicle system 200 as shown in FIG. 2. A representative GPS constellation 202 includes four GPS satellites $SV_1$–$SV_4$ for transmitting GPS data. A vehicle, e.g., an autonomous mining truck, 210 and a base station 220 are adapted to receive the GPS data/navigation signals from each GPS satellite in the constellation using respective GPS antennas 212 and 222.

A GPS receiver can receive GPS navigation signals from a satellite which is "in view" of the receiver, i.e., line-of-sight communications). For example, "in view" may be defined as any satellite that is at least ten degrees up from the horizon. The ten degree angle provides a buffer zone between a useful satellite which is in view and a satellite which is just passing out of view below the horizon.

A "constellation" is a group of satellites selected from the satellites "in view" of a GPS receiver. For example, four satellites may be selected from a group of six which are in view of a GPS receiver. The four satellites are normally selected because of a favorable geometry for triangulation (discussed below).

Base station 220 includes a GPS receiver, i.e., a reference receiver, which is located at a known, fixed position. Base station 220 communicates with vehicle 210 over communications channel 225.

Communication channel 225 represents the communications link between base station 220 and vehicle 210. In the preferred embodiment, communication channel 225 comprises radio transceivers. Communication channel 225 is used to transfer data between base station 220 and vehicle 210. This might be done, for example, if a differential GPS system is implemented.

System 200 may optionally include one or more pseudolites 230. A "pseudolite" is a transmitting system located on or near the Earth's surface which emulates a GPS satellite. Because a pseudolite has a fixed, known position, it can greatly enhance the position estimates derived from GPS. For ease of discussion herein, only GPS satellites 102 (also referred to as $SV_i$ or space vehicle) will be referenced. It should be understood, however, that where position data from a satellite is required, pseudolite data may be substituted.

Figure 3:
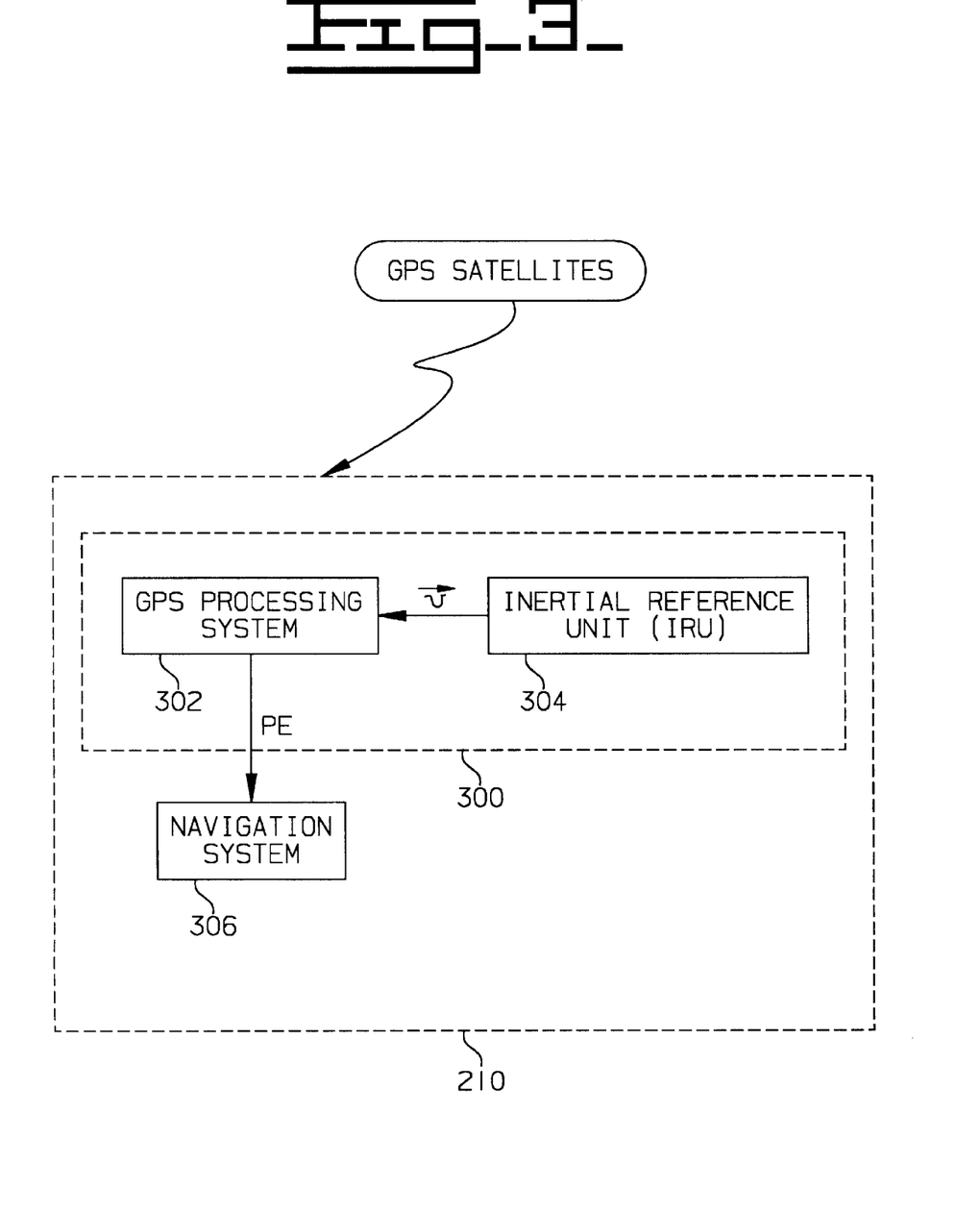
FIG. 3 is a block diagram of the autonomous vehicle system of the invention.

The task of guiding vehicle 210 along a prescribed path requires, among other things, an accurate estimate of the vehicle's current position relative to some reference point. Once the current position is known, vehicle 210 can be commanded to proceed to its next destination. To accomplish this automated vehicle operation, vehicle 210 includes a vehicle positioning system (VPS) 300 and a navigation system 306. This is illustrated in FIG. 3.

VPS 300 allows position estimates (PE) of vehicle 210 to be determined with extreme precision. Navigation system 306 receives the position estimates from VPS 300. Navigation system 320 then uses these precise position estimates to accurately navigate vehicle 210.

VPS 300 includes a GPS processing system 302 and an inertial reference unit (IRU) 304. GPS processing system 302 receives GPS data, i.e., navigation signals, from GPS satellites 102 and velocity data from IRU 304 and computes a position estimate for vehicle 210 therefrom. IRU 304 tracks changes in vehicle position using accelerometers and/or laser gyroscopes.

Figure 4:
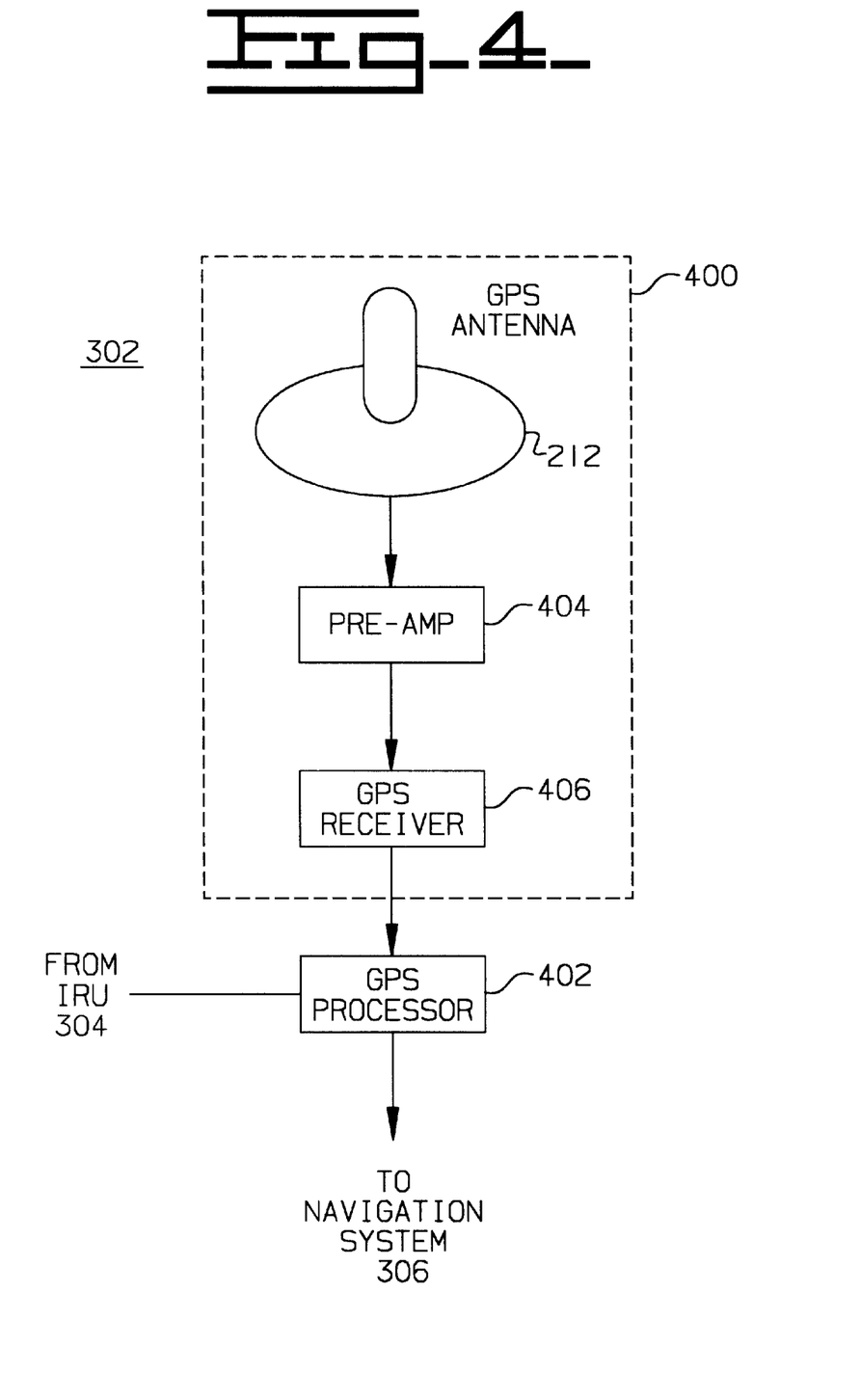
FIG. 4 is a block diagram of a GPS processing system.

GPS processing system 302 is the heart of system 200. With reference to FIG. 4, GPS processing system 302 includes a receiver system 400 and a GPS processor 402. Receiver system 400 receives and decodes the navigation signals from the satellites. GPS processor 402 then uses the information from receiver system 400 to compute the vehicle position estimate.

Receiver system 400 includes a GPS antenna 212, a preamplifier 404, and a GPS receiver 406. Antenna 212 is adapted to receive electromagnetic radiation in the radio portion of the spectrum. Preamplifier 404 amplifies a GPS navigation signal received by GPS antenna 212 from a selected GPS satellite. GPS receiver 406 is a multi-channel receiver which decodes the GPS navigation signals and produces a code pseudorange and ephemeris data for each selected satellite. GPS receiver 406 also tracks the carrier wave of each navigation signal and produces a delta range for each satellite.

GPS processor 402 uses the code pseudoranges, satellite positions and delta ranges for a plurality of satellites to calculate the position estimate for vehicle 210.

In the preferred embodiment, antenna 212 and preamplifier 404 are integrated into a single unit. The combined antenna/preamplifier 212/404 and receiver 406 are available together under part number MX4200 from Magnavox Advanced Products and Systems Co., Torrence, Calif. GPS processor 402 includes an MC68020 microprocessor, available from Motorola, Inc., of Schaumburg, Ill.

Receiver 406 computes a code pseudorange for each satellite as follows. As described above, each signal transmitted by a GPS satellite is continuously encoded with the exact time at which the signal was transmitted. By noting the time at which the signal was received at receiver 406, a propagation time delay can be computed. This time delay when multiplied by the speed of propagation of the signal ($2.9979245998 \times 10^8$ m/s) will yield the pseudorange from the transmitting satellite to the receiver.

GPS receiver 406 may use an almanac to roughly determine the position of a satellite, e.g., for acquisition purposes. For a more precise determination of satellite position, the receiver decodes the GPS navigation signal and extracts ephemeris data therefrom. The ephemeris data indicates the precise position of the transmitting satellite.

From a user's perspective, GPS processing system 302 is the most important part of the autonomous vehicle system 200. GPS processing system 302 is responsible for receiving the signals from each GPS satellite, for selecting the optimal satellites for processing, for determining the precise position of each selected satellite, for determining the pseudorange to each satellite, and ultimately for estimating the position of the receiver based on the satellite positions and the pseudoranges. All of this must be done using received data (of greatly attenuated amplitudes) which is most often heavily corrupted with noise, e.g., noise produced by the atmosphere, the preamplifier and the receiver. GPS processing system 302 relies extensively on Kalman Filtering to eliminate the noise from the GPS navigation signals.

A Kalman filter is a recursive least-squares algorithm which is normally implemented via software or firmware on a digital computer (processor 402). In the preferred embodiment, the Kalman filter assumes that the noisy signals are discrete rather than continuous in nature. Both the data and noise are modeled in vector form, and the data is processed recursively.

A Kalman filter performs two functions. First, it extrapolates a data estimate from previous data. Second, it updates and refines the extrapolated data estimate based on current data. For example, if a vehicle position pi and velocity $v_1$ are known at time $t_1$, then the filter (performing the extrapolation step) will use $p_1$ and $v_1$ to estimate a position $p_2$ at a time $t_2$. Thereafter (performing the update step), newly acquired data at time $t_2$ is used to refine the position estimate $p_2$. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," *IEEE Transactions on Automatic Control*, Vol. AC-28, No. 3, March 1983, both of which are incorporated herein by reference.

Conventionally, because the Kalman filter is a linear filter, the distance equations set forth above are not solved directly, but are first linearized. That is, the equations are differentiated and the derivative of each equation is solved in order to compute a change from a last known position. For example, a first position estimate at time $t_i$ can be rapidly computed by GPS processor 402 by differentiating the navigation equations and solving for a change in position $(\Delta x_v, \Delta y_v, \Delta z_v)$ from a last known vehicle position $(x_v, y_v, z_v)_{i-1}$ at $t_{i-1}$. This greatly simplifies the solution of the distance equations.

As an alternative to Kalman filtering, least squares estimation or best fit polynomial matching may be used.

Figure 5:
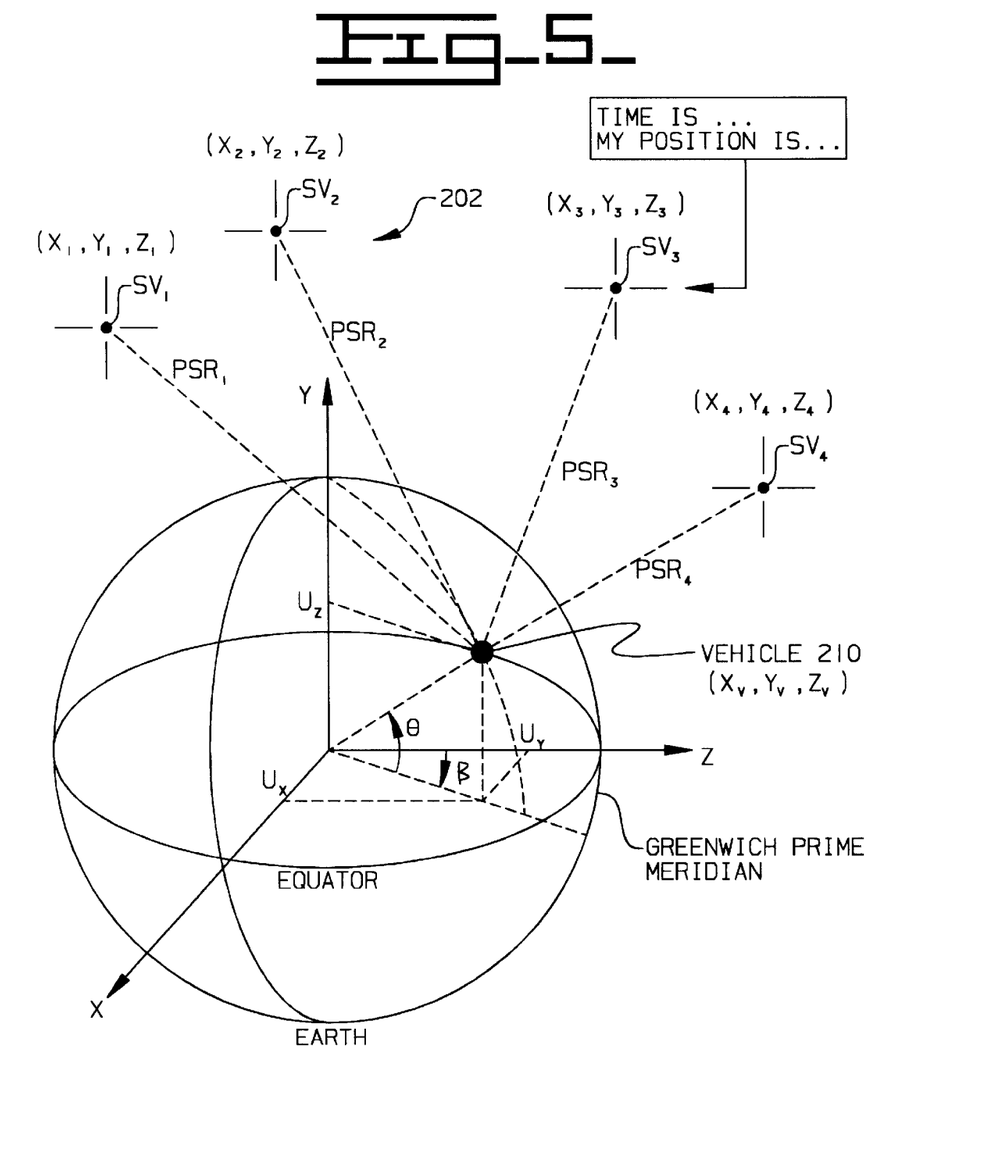
FIG. 5 is a diagram showing the geometric relationship between the center of the Earth, a vehicle near the surface of the Earth and a constellation of GPS satellites.

The basic method used by GPS processor 402 in calculating a vehicle position estimate from the pseudoranges and satellite positions is described with reference to FIG. 5. FIG. 5 shows a sample satellite constellation 202, having GPS satellites $SV_1$–$SV_4$, in view of vehicle 210. In Cartesian coordinates, with respect to the center of the Earth, satellite $SV_1$ is located at $(x_1,y_1,z_1)$; satellite $SV_2$ is located at $(x_2,y_2,z_2)$; satellite $SV_3$ is located at $(x_3,y_3,z_3)$; satellite $SV_4$ is located at $(x_4,y_4,z_4)$; and vehicle 210 is located at a position $(x_v, y_v, z_v)$.

The Cartesian (x,y,z) coordinates of each satellite are determined by GPS receiver 406 using the satellite's ephemeris data. The code pseudoranges ($PSR_1$, $PSR_2$, $PSR_3$ and $PSR_4$) between vehicle 210 and each satellite are determined by GPS receiver 406 using transmission time delays. Given this information for at least four satellites, the location of vehicle 210 (i.e., receiver 406) may be determined using the following four distance equations:

$$(x_1-x_v)^2+(y_1-y_v)^2+(z_1-z_v)^2=(PSR_1-B_{clock})^2$$
$$(x_2-x_v)^2+(y_2-y_v)^2+(z_2-z_v)^2=(PSR_2-B_{clock})^2$$
$$(x_3-x_v)^2+(y_3-y_v)^2+(z_3-z_v)^2=(PSR_3-B_{clock})^2$$
$$(x_4-x_v)^2+(y_4-y_v)^2+(z_4-z_v)^2=(PSR_4-B_{clock})^2$$

where: $B_{clock}$=clock bias.
The "clock bias" is a zero order correction factor which roughly compensates for the clock error discussed above.

Note that there are four unknowns in these equations: $x_v$, $y_v$, $z_v$, and $B_{clock}$. Note also that each satellite produces an equation. Thus, we have four satellites and four unknowns, allowing the equations to be solved for the clock bias ($B_{clock}$) and the position $(x_v,y_v,z_v)$ of vehicle 210.

Note that the accuracy of the GPS position estimate is highly dependent on the pseudoranges computed by receiver 406. As discussed above, these pseudoranges can be heavily corrupted by atmospheric effects, selective availability, multi-path errors (reflections), clock errors, and other miscellaneous noise sources.

GPS processor 402 increases the accuracy of the pseudoranges, and hence the precision of the position estimate, using carrier phase techniques. Large cycle slip errors are detected so that they can be rapidly corrected.

The invention detects large cycle slip errors using velocity data from IRU 304. An IRU computed velocity along the line-of-sight vector to a satellite is compared to a carrier computed velocity. If the difference between the two velocities exceeds a predetermined value, then it is presumed that a cycle slip has occurred. Once a cycle slip is detected, then GPS processing system 302 may be adjusted to compensate for the error.

Figure 6:
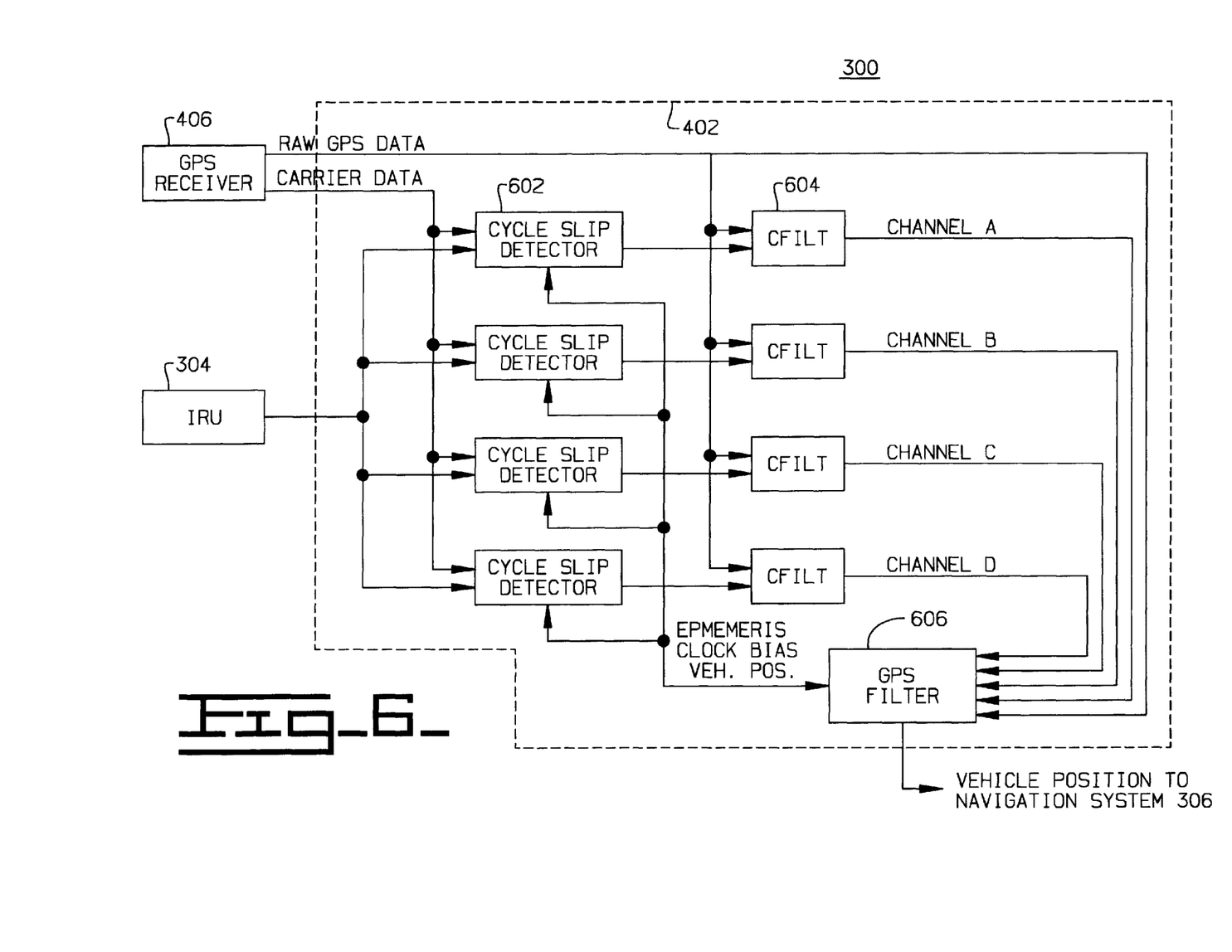
FIG. 6 is a block diagram of the vehicle positioning system of the invention.

The preferred embodiment of vehicle positioning system 300 is illustrated in FIG. 6. VPS 300 includes GPS receiver 406, IRU 304 and GPS processor 402. GPS receiver 406 and GPS processor 402 are shown having four channels for ease of discussion. However, it should be noted that in the preferred embodiment, GPS receiver 406 and GPS processor 402 have more than four (e.g., six) channels. The additional channels are used when more than four satellites are in view of the receiver. The additional channels allow smoother transitions as satellites pass into and out of view of the receiver. Further, the additional satellites can provide redundant satellite data to GPS filter 606.

Each channel of GPS processor 402 includes a cycle slip detector 602 and a pseudorange filter (CFILT) 604. GPS processor 402 also includes a GPS filter 606.

Cycle slip detectors 602 detect large cycle slip errors in the carrier (delta range) data from GPS receiver 406. Each cycle slip detector 602 receives carrier data from GPS receiver 406; vehicle velocity data from IRU 304; and satellite position, clock bias and vehicle position data from GPS filter 606. Each cycle slip detector 602 outputs a cycle slip error flag upon detecting a cycle slip error.

Each pseudorange filter (CFILT) 604 receives as input the raw GPS data (i.e., code pseudoranges, satellite positions, and delta ranges) from GPS receiver 406 and, if a large cycle slip has occurred, a cycle slip error flag from the corresponding cycle slip detector 602. Each pseudorange filter 604 outputs a refined pseudorange to GPS filter 606. The cycle clip error flag indicates to filter 604 that a large cycle slip has occurred and that the carrier data is therefore unreliable. Operation of pseudorange filter 604 and handling of the cycle slip error flag is described below.

GPS filter 606 receives raw GPS data from GPS receiver 406 and the refined pseudoranges from the pseudorange filters 604. Based on this data, GPS filter 606 produces an accurate vehicle position which is provided to navigation system 306. In the preferred embodiments, GPS filter 606 is a Kalman filter.

Figure 7:
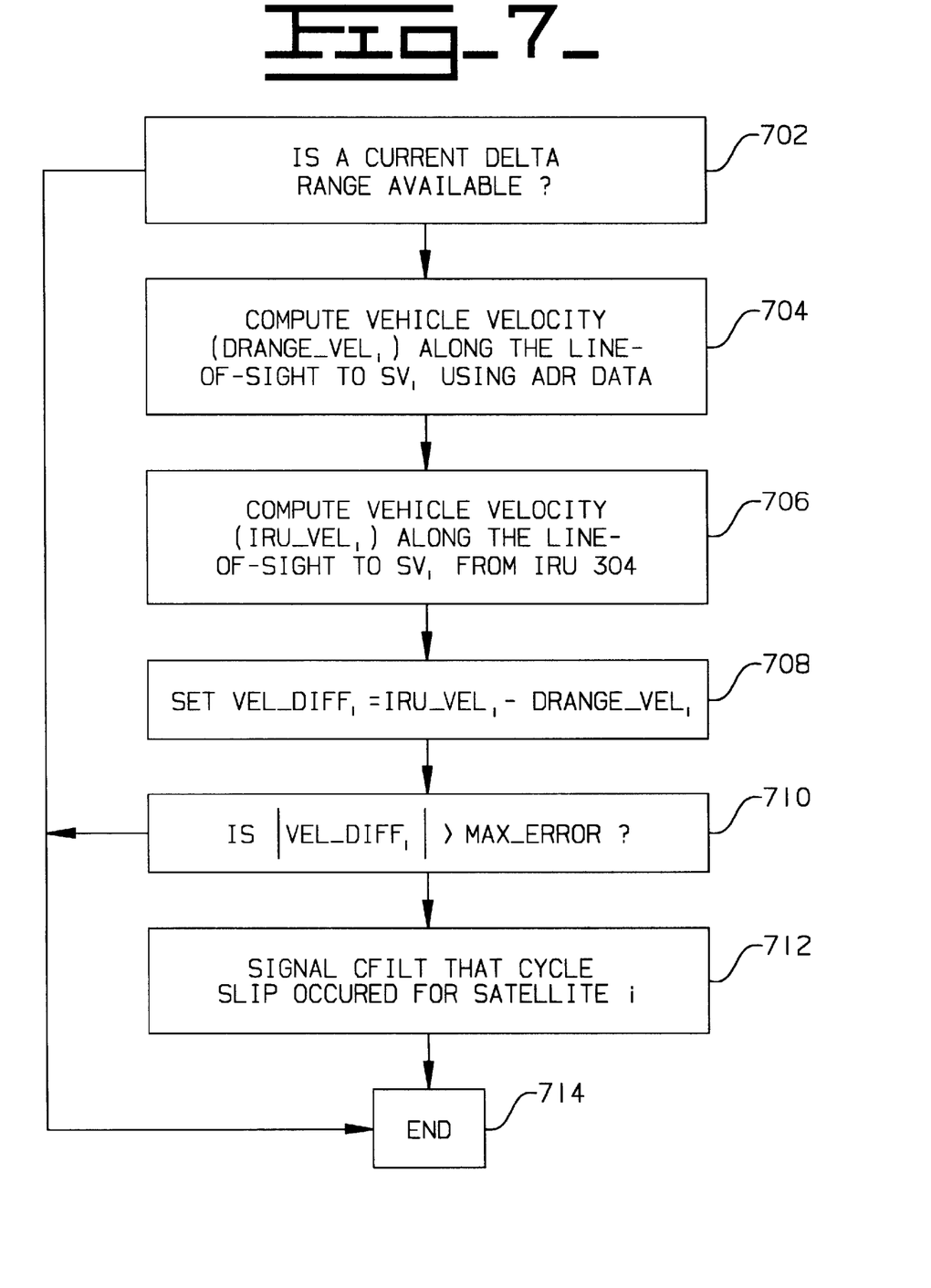
FIG. 7 is a flow chart illustrating operation of the cycle slip detector of the invention.

The method of the invention for detecting a cycle slip error is illustrated in FIG. 7. In a step 702, a delta range from GPS receiver 406 is received into cycle slip detector 602. If a current delta range is not available, then the method ends at step 714. If a current delta range is available, then the method proceeds to step 704. In step 704, cycle slip detector 602 computes a vehicle velocity (DRANGE_VEL$_i$) from the delta range. The delta range computed velocity is a velocity of the vehicle with respect to the satellite SV$_i$ along the line-of-sight to the satellite. Step 704 is described in detail below with reference to FIG. 8.

In a step 706, cycle slip detector 602 receives a vehicle velocity from IRU 304 and computes a velocity (IRU_VEL$_i$) of the vehicle with respect to the satellite SV$_i$ along the line-of-sight to the satellite. Step 706 is described in detail below with reference to FIG. 9. The difference (VEL_DIFF$_i$=IRU_VEL$_i$−DRANGE_VEL$_i$) between the IRU measured velocity and the delta range computed velocity is determined in a step 708. In a step 710, the velocity difference (VEL_DIFF$_i$) is compared to a predetermined threshold (MAX_ERROR). If the difference exceeds the threshold, then it is presumed that a cycle slip has occurred, and a flag is sent in a step 712 to CFILT 604 indicating that the ADR data is corrupted. If the difference does not exceed the threshold, then the method ends at step 714.

Figure 8:
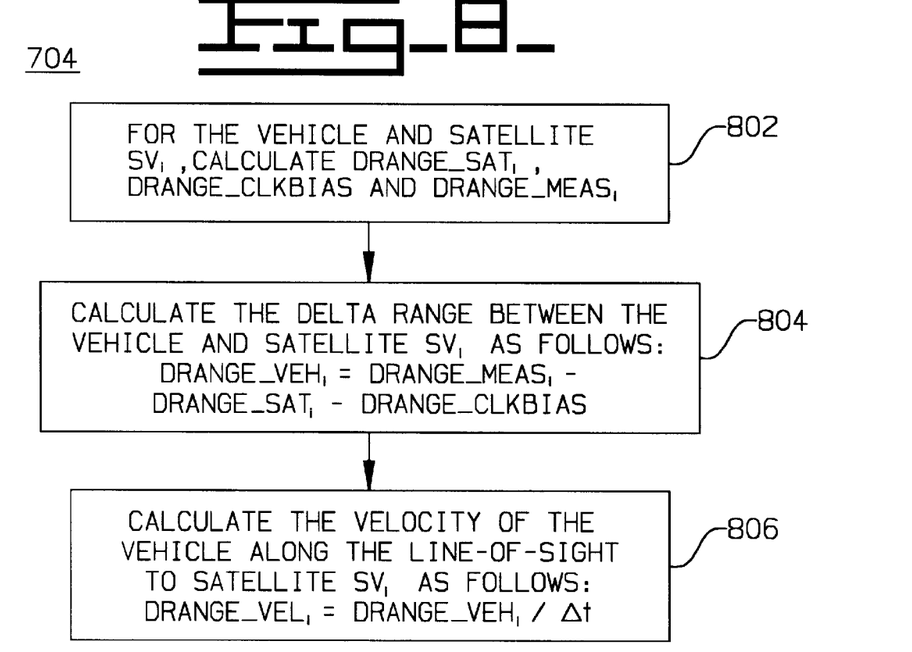
FIG. 8 is a flow chart illustrating a method for computing a velocity of a vehicle along the line-of-sight to a satellite using a delta range.

FIG. 8 illustrates the method of step 704 of computing a vehicle velocity along the line-of-sight to satellite SV$_i$ using a delta range. The variables used in this flow chart are defined in Table I.

TABLE I

| Variable | Definition |
| --- | --- |
| DRANGE_SAT$_i$ | Delta range from a vehicle to a satellite SV$_i$ due to relative motion of the satellite and the Earth over time Δt |
| DRANGE_CLKBIAS | Delta range due to a clock bias rate over time Δt |
| DRANGE_MEAS$_i$ | Measured delta range for satellite SV$_i$ |
| DRANGE_VEH$_i$ | Delta range from satellite SV$_i$ due to vehicle motion relative to the Earth |
| DRANGE_VEL$_i$ | Magnitude of vehicle velocity component in direction (line-of-sight) of satellite SV$_i$ |

At step 802, values are calculated for DRANGE_SAT$_i$, DRANGE_CLKBIAS and DRANGE_MEAS$_i$. DRANGE_SAT$_i$ is computed using ephemeris data and vehicle position data from GPS filter 606. DRANGE_CLKBIAS is computed using filtered clock bias data from GPS filter 606. DRANGE_MEAS is computed from the cycle count of the carrier wave from satellite SV$_i$.

At step 804, a value for DRANGE_VEH$_i$ is computed by subtracting the values of DRANGE_SAT$_i$ and DRANGE_CLKBIAS from DRANGE_MEAS$_i$. A value for DRANGE_VEL$_i$ is then computed at step 806 by dividing DRANGE_VEH$_i$ by the time interval (Δt) over which the carrier data has been collected.

Figure 9:
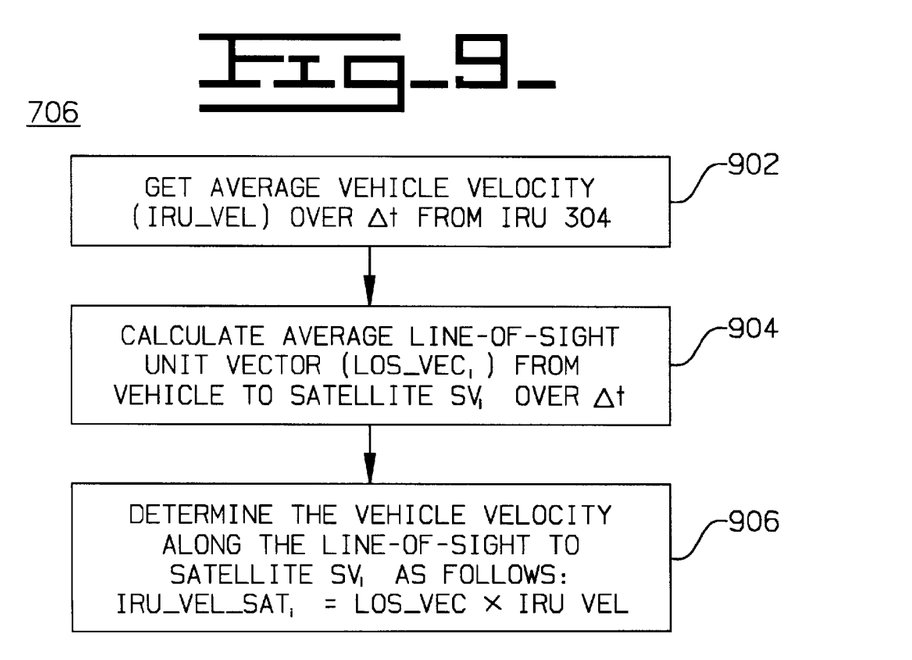
FIG. 9 is a flow chart illustrating a method for computing a velocity of a vehicle along the line-of-sight to a satellite using data from an inertial reference unit.

FIG. 9 illustrates the method of step 706 of computing a vehicle velocity along the line-of-sight to satellite SV$_i$ using IRU data. In a step 902, the average velocity of the vehicle over time interval Δt is received from IRU 304. In a step 904, an average line-of-sight unit vector (LOS_VEC$_i$) is computed from the vehicle to satellite SV$_i$ for time interval Δt. The line-of-sight unit vector is computed using the satellite position (from ephemeris data and GPS time) and the vehicle position from GPS filter 606. Finally, at step 906, the average vehicle velocity IRU_VEL_SAT$_i$ along the line-of-sight to satellite SV$_i$ is computed by multiplying the average vehicle velocity (IRU_VEL$_i$) by the line-of-sight unit vector LOS_VEC.

Once the cycle slip has been detected and the cycle slip error flag has been sent to pseudorange filter 604, filter 604 must respond to the error flag. The preferred response is for the pseudorange filter to give less weight (i.e., credibility) to the ADR data and to put more weight on the code pseudorange in computing a refined pseudorange. The precise response of the filter to the error flag will, however, depend on the implementation of filter 604.

The manner in which filter 604 uses the code pseudorange and the carrier data to produce a refined pseudorange is not critical to the invention. Any of a number of known methods may be used. For example, in "Multipath Sensitivity and Carrier Slip Tolerance of an Integrated Doppler DGPS Navigation Algorithm," Sennott et al. teach using the carrier pre-filters (CFILT) to estimate the offsets between pseudorange and ADR observations. Essentially, each CFILT is a discreet, linear Kalman filter. The receiver code pseudorange Z$_{psr}$ from the receiver is modeled by the equation:

$$Z_{psr} = \rho_{free}(t) + T_c(t) + B_{sv} + B_{tropo} + B_{iono} + m_{code}(t) + w_{code}(t)$$

The ADR from the receiver is modeled by the equation $$Z_{car} = \rho_{free}(t) + T_c(t) + B_{sv} + B_{tropo} - B_{iono} + a(t) + w_{carrier}(t)$$

where:

ρ$_{free}$=ideal GPS free space path delay,

T$_{user}$=receiver-GPS system clock offset, m$_{code}$=path delay error due to code envelop multipath distortion, W$_{code}$=code tracking loop white noise, a(t)=receiver carrier cycle counter bias (ambiguity), B$_{tropo}$=tropospheric propagation error, B$_{iono}$=ionospheric propagation error, and B$_{sv}$=sum of SV ephemeris and SV clock bias error.

The difference (Z$_k$) between these two observables, i.e., the code pseudorange and the ADR, is then represented by the equation:

$$Z_k = Z_{psr} - Z_{car} = 2B_{iono} - a(t) + m_{code}(t) + w_{code}(t) - w_{carrier}(t)$$

The Kalman filter states are defined as:

$x_1^{pre} = 2B_{iono}$ (twice iono bias), $x_2^{pre} = \dot{x}_1^{pre}$ (twice iono bias rate), $x_3^{pre} = m_{code}$ (code multipath error) and $x_4^{pre} = -a_{car}$ (receiver carrier counter offset).

Using these state definitions, Z$_k$ becomes $$Z_k = Z_{psr} - Z_{car} = x_1^{pre} + x_3^{pre} + x_4^{pre} + w_{code} - w_{car}$$

At the output of CFILT, the first and fourth states may be used to form a refined pseudorange:

$$Z_{fine} = Z_{car} + x_1^{pre} + x_4^{pre}$$

which then yields the precise pseudorange:

$$Z_{fine} = \rho_{free} + T_{user} + w_{fine} + B_{sv} + B_{tropo} + B_{iono}$$

For a more detailed discussion on the sample operation of pseudorange prefilter (CFILT), see Sennott et al.

In the CFILT Kalman filter, the observation model is Z$_k$=H$_k$X$_k$+V$_k$ and the state model is X$_k$=Φ$_{k-1}$X$_{k-1}$+W$_{k-1}$, where:

Z$_k$ is the observable parameter (code pseudorange or ADR),

H$_k$ is the matrix which binds Z$_k$ and X$_k$ with the noise,

X$_k$ is the pseudorange state vector for time (k),

V$_k$ is a noise model, $\Phi_{k-1}$ is the projection matrix for time k-1, $X_{k-1}$ is the pseudorange state vector for time (k-1), and $W_{k-1}$ is a noise model for time sample (k-1).

When a cycle slip is detected by detector 602, an error flag is sent to CFILT 604. The error flag indicates to CFILT 604 that the ADR data is no longer valid. Depending on how CFILT 604 has been implemented, it may react in a number of ways. For example, if CFILT is implemented in accordance with the teachings of Sennott et al. described above, then the $\Phi$ matrix can be adjusted to "open-up" the Kalman filter. By "open-up" it is meant to allow the filter to respond more quickly to changing observables. This will allow the filter to rapidly correct for the cycle slip.

Opening the filter will also reduce its low-pass filtering effect such that the pseudorange solution will contain additional noise. This, however, is an acceptable consequence. The pseudorange errors caused by the additional noise will be much smaller than the errors caused by the cycle slip.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for detecting carrier signal cycle slip errors in a position determining system which receives navigation signals at a receiver from a plurality of satellites, the method comprising the steps of:

(a) receiving, at the receiver, a navigational signal from a satellite, said navigation signal including a continuous carrier wave;

(b) counting cycles of said carrier wave over a time $\Delta t$;

(c) computing, from said time $\Delta t$ and said cycle count, a first velocity of the receiver along a vector between the receiver and said satellite;

(d) receiving a second velocity of the receiver from an inertial reference unit;

(e) computing a component of said second velocity along said vector;

(f) computing a difference between said first velocity and said component of said second velocity;

(g) comparing said difference to a predetermined value; and (h) indicating a cycle slip error if said difference exceeds said predetermined value.

2. A method for computing the position of a receiver at or near the surface of the Earth using a satellite-based navigation system having a plurality of satellites, the method comprising the steps of:

(a) receiving, at the vehicle, a continuous navigation signal from each of the plurality of satellites over a time period $\Delta t$ between time $t_1$ and time $t_2$, each said continuous navigation signal having a continuous carrier wave;

(b) counting cycles of each said continuous carrier wave over said time $\Delta t$ for each said continuous navigation signal;

(c) monitoring each cycle count for a cycle slip error, wherein step (c) comprises, for each satellite, the steps of, (1) computing, from said time $\Delta t$ to said cycle count, a first velocity of the receiver along a vector between the receiver and said satellite, (2) computing a second velocity of the receiver along said vector based on data from an inertial reference unit associated with the receiver, (3) computing a difference between said first and second velocities, and (4) determining whether said difference exceeds a predetermined value, and if so, indicating that a cycle slip has occurred for said satellite;

(d) computing a satellite position for each of the plurality of satellites at time $t_2$ based upon ephemeris data provided by each said continuous navigation signal;

(e) computing a code pseudorange for each of the plurality of satellites at time $t_2$ based on each of said continuous navigation signals;

(f) for each satellite for which a cycle slip was not detected at step (c), computing a refined pseudorange from said code psuedorange and said cycle count;

(g) for each satellite for which a cycle slip was detected at step (c), computing a refined pseudorange from said code pseudorange; and (h) computing the position of the receiver from said satellite positions and said refined pseudoranges.

3. An apparatus for detecting carrier wave cycle slip errors in a position determining system which receives navigation signals at a receiver from a plurality of navigation satellites and which counts cycles of the carrier wave for each navigation signal, the apparatus comprising:

carrier means for computing a first velocity of the receiver along a vector between the receiver and the satellite for each satellite based on cycle count data;

inertial means for measuring a second velocity of the receiver based on movement of the receiver;

comparison means for comparing said first velocity with a component of said second velocity along said vector; and means for indicating a cycle slip error when a difference between said first velocity and said component of said second velocity along said vector exceeds a predetermined value.

4. An apparatus for computing an estimated position relative to the surface of the Earth based on navigation signals received from a satellite-based navigation system, the apparatus comprising:

a receiver configured to receive a navigation signal from a each of a plurality of satellites, to compute a code pseudorange for each satellite, to compute a position for each satellite, and to count cycles of a carrier wave of each navigation signal;

carrier means for receiving said cycles of said carrier wave from said receiver and for computing, for each satellite, a first velocity of the receiver along a vector between the receiver and each satellite;

inertial means for measuring a second velocity of the receiver based on movement of the receiver;

means for comparing said first velocity with a component of said second velocity along said vector and for indicating a cycle slip error when a difference between said first velocity and said component of said second velocity along said vector exceeds a predetermined value;

pseudorange filter means for receiving said code pseudoranges, said cycle counts and said indication of a cycle slip error and for computing a refined pseudorange for each satellite; and filter means for receiving said satellite positions and said refined pseudoranges and for computing a position of said receiver therefrom.

* * * * *